(12) United States Patent
Suresh et al.

(10) Patent No.: US 12,542,713 B2
(45) Date of Patent: Feb. 3, 2026

(54) PRINTER DISCOVERY AND RANKING

(71) Applicant: Hewlett Packard Enterprise Development LP, Spring, TX (US)

(72) Inventors: Swetha Nandyalam Suresh, Karnataka (IN); Mahesh Venkateshwaran, Karnataka (IN); Srivaths Janakiraman Mohan, Karnataka (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 52 days.

(21) Appl. No.: 18/641,588

(22) Filed: Apr. 22, 2024

(65) Prior Publication Data

US 2025/0247290 A1    Jul. 31, 2025

(30) Foreign Application Priority Data

Jan. 25, 2024  (IN) .............................. 202441005341

(51) Int. Cl.
*H04L 41/0816* (2022.01)
*G06F 3/12* (2006.01)

(52) U.S. Cl.
CPC ........ *H04L 41/0816* (2013.01); *G06F 3/1204* (2013.01); *G06F 3/1226* (2013.01); *G06F 3/1232* (2013.01); *G06F 3/1287* (2013.01)

(58) Field of Classification Search
CPC . H04L 41/0816; G06F 3/1204; G06F 3/1226; G06F 3/1232; G06F 3/1287
See application file for complete search history.

(56) References Cited

U.S. PATENT DOCUMENTS

2018/0027372 A1*  1/2018  Agarwal ............... H04W 64/00
                                                      709/224

OTHER PUBLICATIONS

Tang etg al., "A Service Oriented device selection solution based on user satisfaction and device performance ina ubiquitous enviroemnt", 2015.*
Zhang et al, "Service recommendation model based on trust and QoS for social internet of things", 2023.*
Mainetti et al, "Discovery and Mash-up of physical resources through a Web of Thiings architecture", 2014.*
Bergman et al., "Printer MIB v2", Request for Comments: 3805, Jun. 2004, 171 pages.

* cited by examiner

*Primary Examiner* — Todd L Barker
(74) *Attorney, Agent, or Firm* — Hewlett Packard Enterprise Patent Department (57) ABSTRACT

Printers are ranked and the printer ranks are provided to a user during printer discovery. A wireless configuration at an access point may include ranks for the printers along with access policies for the printers. The access policies are used to provide a list of available printers to a user. The ranks of the available printers are also provided to the user. A list of available printers may be displayed to the user in descending order of the printer ranks.

17 Claims, 5 Drawing Sheets

PRINTER DISCOVERY AND RANKING

BACKGROUND

A large enterprise may contain many end devices. The end devices include printers, which may be networked. A user in a large enterprise may attempt to discover nearby networked printers via a multicast protocol. Modern network printing protocols allow for detailed discovery of networked printers. A particular location of an enterprise may have multiple printers that could be chosen by the user for printing a document.

BRIEF DESCRIPTION OF THE DRAWINGS

Aspects of the present disclosure are best understood from the following detailed description when read with the accompanying figures.

Corresponding numerals and symbols in the different figures generally refer to corresponding parts unless otherwise indicated. The figures are drawn to clearly illustrate the relevant aspects of the disclosure and are not necessarily drawn to scale.

DETAILED DESCRIPTION

The following disclosure provides many different examples for implementing different features. Specific examples of components and arrangements are described below to simplify the present disclosure. These are, of course, merely examples and are not intended to be limiting.

When a user attempts to print a document, they may select a networked printer that is nearby without noticing its supply levels. As a result, the user may print a document at a printer that is low on supplies (e.g., marker, paper, etc.), which results in the document printing being interrupted. When there are multiple networked printers available to the user at a particular location, it would be more convenient for the user to print to a printer that has sufficient supply levels.

When selecting a networked printer for printing a document, a user may be presented with multiple available options. The networked printers available to a user may be discovered through a discovery protocol. An access point may be programmed with a wireless configuration that includes access policies for printers. The access point may receive a discovery request from a user via the discovery protocol, and may respond with a list of networked printers that are available to the user, which list is determined based on the access policies. For example, an access policy may indicate that a particular user in a particular location is authorized to discover a particular printer, in which case that printer may be presented as available to the user.

The present disclosure describes a printing system that provides printer ranks to a user during printer discovery. Specifically, the wireless configuration at an access point may include ranks for the printers along with access policies for the printers. When using the access policies to provide a list of available printers to a user, the access point may also provide the ranks of the available printers to the user. The printer ranks may be previously determined, by a management service, according to the supply levels of the printers. Thus, the printers that are available to a user may be ranked according to the supply levels. The list of available printers may be displayed to the user in descending order of the printer ranks, so that a user is more likely to select a printer with sufficient supply levels.

In some implementations, an access point may obtain attributes of one or more networked printers. For example, the printer attributes may be obtained via a network printing protocol. The access point may send the printer attributes to a management server, which is in a different network than the access point and the printers. For example, the management server may be part of a management service in a cloud network. The management server may generate a wireless configuration for the access point. The wireless configuration includes access policies for the printers as well as ranks of the printers. The management server may rank the printers based on the printer attributes. The wireless configuration may then be sent back to the access point, which may be programmed with the wireless configuration.

Figure 1:
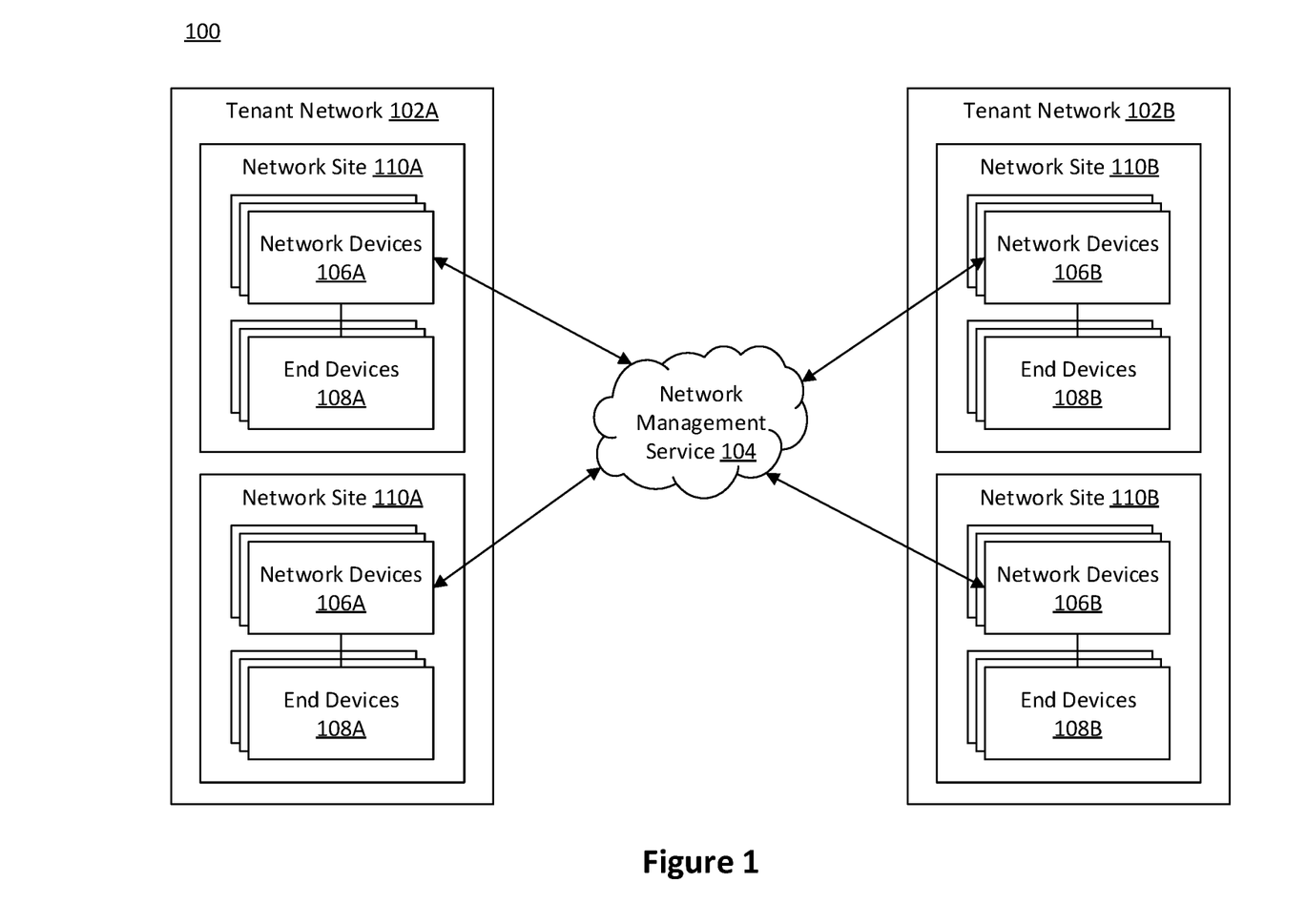
FIG. 1 is a block diagram of a network management system, according to some implementations.

FIG. 1 is a block diagram of a network management system 100, according to some implementations. The network management system 100 includes multiple tenant networks 102 (e.g., a first tenant network 102A and a second tenant network 102B) and a network management service 104. The network management service 104 manages network devices and/or deployments of multiple tenants. The network management service 104 may run in a publicly accessible computer network, such as a cloud network, that is accessible by the tenant networks 102 and by network administrators. The network management system 100 may be an edge-to-cloud platform, in which tenants' network devices may be centrally managed from a cloud platform.

The tenant networks 102 include network devices 106 (e.g., first network devices 106A and second network devices 106B for, respectively, the first tenant network 102A and the second tenant network 102B). Additionally, the tenant networks 102 may include end devices 108 (e.g., first end devices 108A and second end devices 108B for, respectively, the first tenant network 102A and the second tenant network 102B). The network devices 106 of a tenant network 102 form a transport network that provides connectivity and routing between the end devices 108 of the tenant network 102. Examples of the network devices 106 include switches, routers, wireless access points, gateways, and the like. Examples of the end devices 108 include user devices (e.g., personal computers, mobile devices, etc.), printers, servers, phones, cameras, smart televisions, and the like. The network devices 106 may be used to provide wired and/or wireless local area networks, wide area networks, virtual private networks, or the like, to which the end devices 108 connect.

The end devices 108 and/or the network devices 106 may be located in different network sites 110 (e.g., first network sites 110A and second network sites 110B for, respectively, the first network devices 106A and the second network devices 106B). The network devices 106 of the different network sites 110 may communicate with the same network management service 104, such as via a wide-area network (WAN). The network devices 106 of a tenant network 102 may interconnect the end devices 108 of the tenant network 102 across the network sites 110 of the tenant network 102.

The network management service 104 is adapted to manage the network devices 106. For example, the network management service 104 may be a central point of control that is accessible by network administrators of the tenant networks 102. A network administrator of a tenant network 102 may access the network management service 104 and use it to control the network devices 106 of the tenant network 102. Suitable authentication and authorization techniques may be used to limit access to the appropriate network administrator(s) of the respective tenant networks 102. For example, a first network administrator of the first tenant network 102A may be permitted to control the first network devices 106A via the network management service 104, while a second network administrator of the second tenant network 102B may be permitted to control the second network devices 106B via the network management service 104.

The network management service 104 may be used to streamline network administration operations for the tenant networks 102. For example, the network management service 104 may perform provisioning, onboarding, configuration management, and programming of the network devices 106. Thus, the network devices 106 are managed network devices. The network management service 104 may also manage the end devices 108. Additionally, the network management service 104 may be used to provide network insights, visibility, troubleshooting, and the like for network administrators.

The network management service 104 is in a network that may be different than the tenant networks 102. In some implementations, the network management service 104 is operated in a publicly accessible computer network, such as a cloud network, by a network management provider, while the tenant networks 102 may be privately accessible computer networks operated by tenants (or customers) of the network management provider. For example, while the network management service 104 may provide a central point of control for each tenant network 102, tenants' data may still be kept on-site at their tenant networks 102.

The network devices 106 include access points, while the end devices 108 include printers and user devices. As subsequently described in greater detail, the access points will be programmed, by the network management service 104, with a wireless configuration. The wireless configuration specifies how the access points should operate, in order to form a desired network. Additionally, the wireless configuration includes access policies for the end devices 108, including access policies for the printers, as well as ranks for the printers. A user device may discover the printers available to a user by sending a discovery request to an access point. The access point, based on the wireless configuration (including the access policies and the printer ranks), provides a list of the available printers to the user device, along with the ranks of the available printers.

Figure 2:
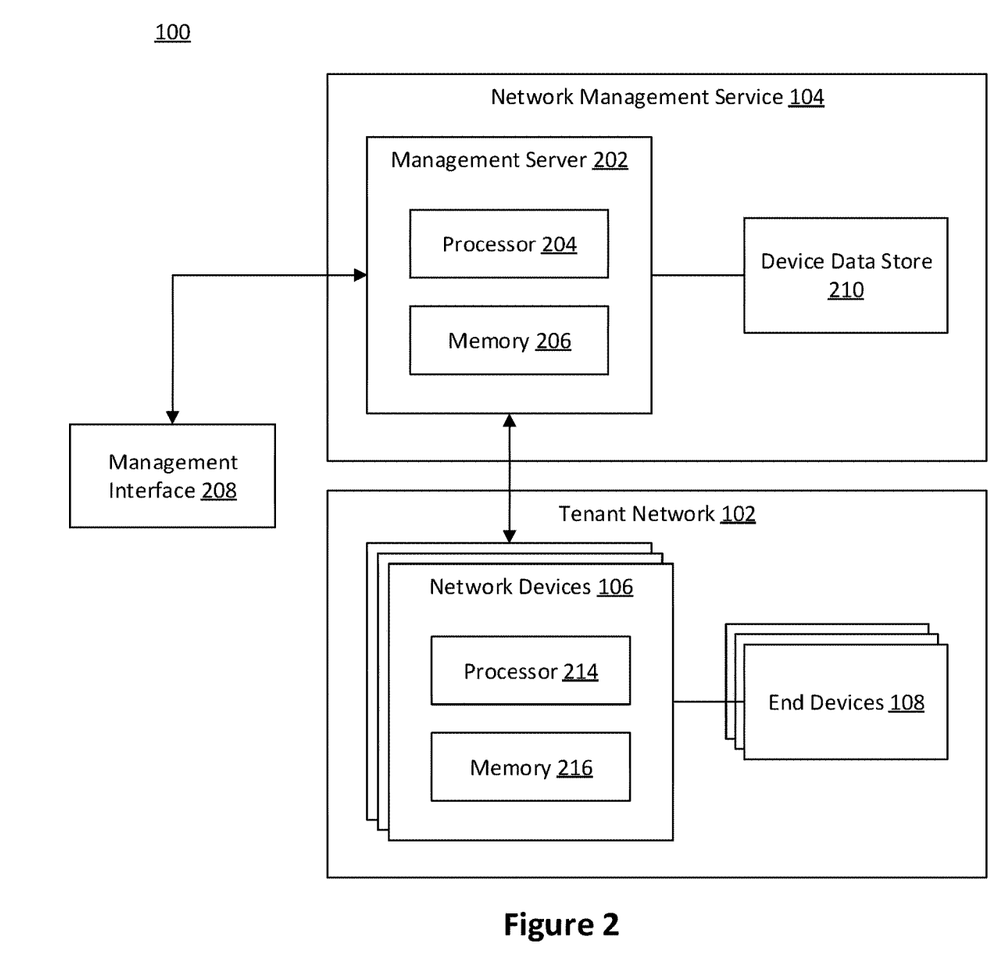
FIG. 2 is a block diagram of the network management system, according to some implementations.

FIG. 2 is a block diagram of the network management system 100, according to some implementations. Additional details of the network management system 100, including details of the network management service 104 and a network device 106, are shown. Only one tenant network 102 is shown for illustration clarity.

The network management service 104 includes a network management server 202. The network management server 202 is adapted to control the network devices 106. For example, the network management server 202 may send control messages to a network device 106, indicating a wireless configuration for the access points, and may receive management messages from the network device 106. When the network management service 104 is described herein as performing an operation, the steps of that operation may be performed at least in part by the network management server 202.

The network management server 202 may include any suitable components. Suitable components include a processor, an application-specific integrated circuit, a microcontroller, memory, and the like. The network management server 202 may be a physical computing device. For example, the network management server 202 may include a processor 204 and a memory 206. The memory 206 may be a non-transitory computer readable medium that stores programming for execution by the processor 204. One or more modules within the network management server 202 may be partially or wholly embodied as software and/or hardware for performing any functionality described herein. For example, they may be embodied as software, which is deployed to a physical device using a suitable containerization technique. In some implementations, the network management server 202 is part of a computing cluster, on which containers are deployed.

The network management system 100 may further include a management interface 208, which may be used to control the network management service 104. A network administrator may access the network management service 104 using the management interface 208. The management interface 208 may be a central point of access for the network management service 104, which is accessible from a public computer network such as the Internet. The network management service 104 may receive management commands via the management interface 208. The network management service 104 may process the management commands from the management interface 208, validate the management commands, and execute logic specified by the management commands. Further, the network management service 104 may output the results of management commands via the management interface 208. Examples of the management interface 208 include a management command line interface, a graphical user interface, a web page, or the like.

The network management service 104 may further include a device data store 210. The device data store 210 may store information about the end devices 108 and/or the network devices 106 within the tenant networks 102. Examples of information for a network device 106 include information about the deployment and configuration of the network device 106, such as the device configuration, the device type, the scale of clients, the location of the network device 106 in a tenant network 102, and the like. An example of information for an end device 108, such as a printer, includes time series data for attributes of the printer. The device data store 210 may be implemented with a database, such as a relational database, a key-value store, or the like.

Each network device 106 may include any suitable components. Suitable components include a processor, an application-specific integrated circuit, a microcontroller, memory, and the like. A network device 106 may be a physical computing device. For example, a network device 106 may include a processor 214 and a memory 216. The memory 216 may be a non-transitory computer readable medium that stores programming for execution by the processor 214. One or more modules within a network device 106 may be partially or wholly embodied as software and/or hardware for performing any functionality described herein.

As previously noted, the end devices 108 include printers, and the network devices 106 include access points that will be programmed with a wireless configuration. Attributes of the printers, such as supply levels of the printers, will be collected by the access points and sent to the network management service 104. The network management service 104 will generate the wireless configuration for the access points based at least in part on the printer attributes.

Figure 3:
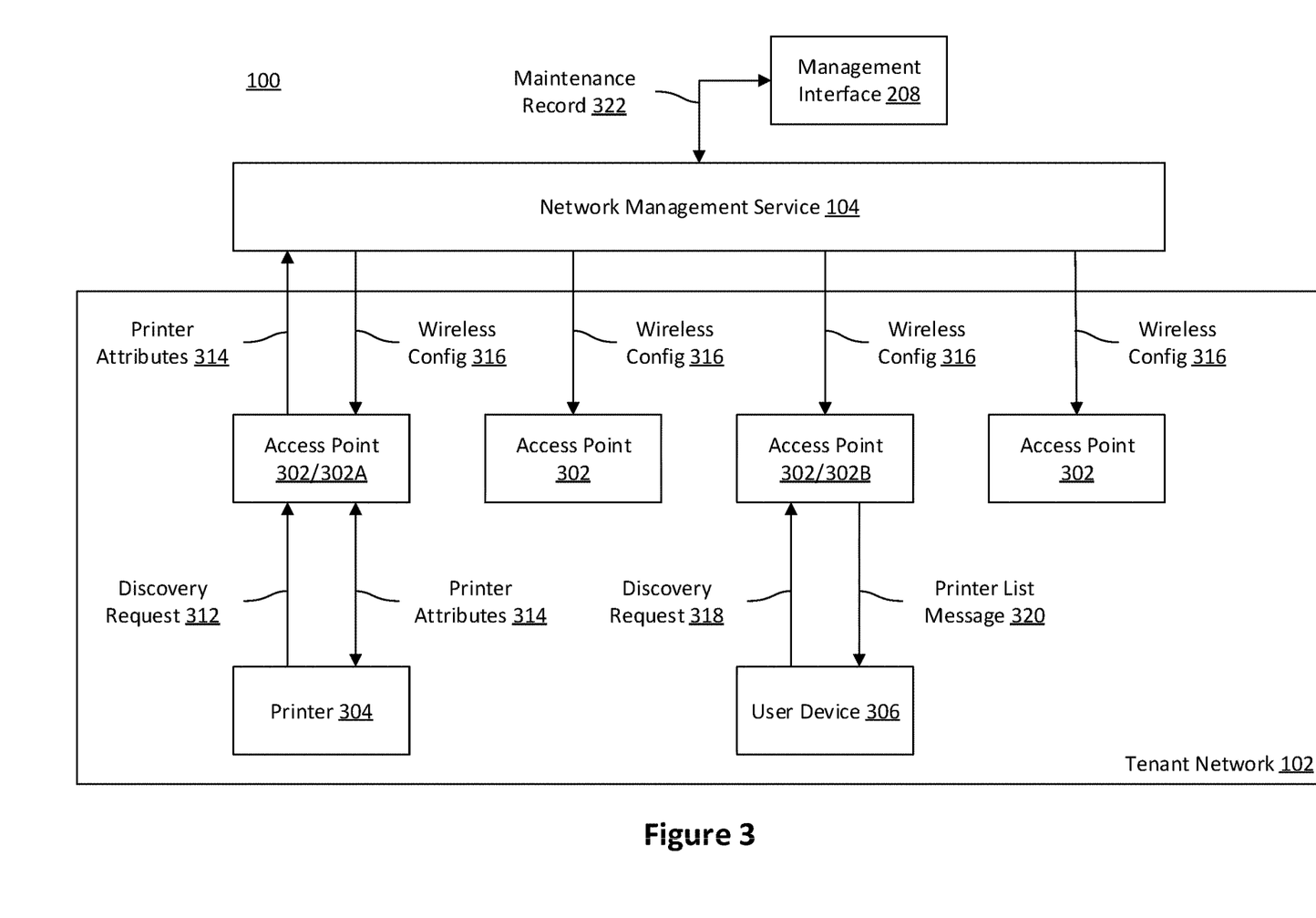
FIG. 3 is a block diagram of the network management system, according to some implementations.

FIG. 3 is a block diagram of the network management system 100, according to some implementations. Additional details of the network management system 100, including access points 302, a printer 304, and a user device 306 of a tenant network 102, are shown. The access points 302 are examples of network devices 106 (previously described for FIG. 1). The printer 304 and the user device 306 are examples of end devices 108 (previously described for FIG. 1). FIG. 3 shows a logical flow during generation of a wireless configuration for the access points 302.

The printer 304 is connected to a target access point 302A. Initially, the printer 304 advertises itself to the target access point 302A, at which point the target access point 302A discovers the printer 304. Specifically, a discovery request 312 may be sent by the printer 304 to the target access point 302A. The discovery request 312 may include an IP address of the printer 304. A discovery request may identify the services offered by the sender, which helps the target access point 302A identify the source as a printer.

In some implementations, the discovery request 312 is a multicast request that is sent via a multicast protocol. For example, the printer 304 may advertise itself via a zero-configuration networking technology, such as one implementing multicast Domain Name System (mDNS). The target access point 302A may receive an mDNS request from the printer 304. The access points 302 may filter multicast requests (from end devices) so that they are prevented from propagating throughout the tenant network 102. That is, the access points 302 may decline to forward multicast requests to all of the user devices 306 in the tenant network 102. The target access point 302A may receive a multicast request from the printer 304 and then convert the multicast request to a unicast request, thereby terminating the multicast request. Doing so may decrease multicast traffic in the tenant network 102, thereby improving the performance of the tenant network 102. The access points 302 may keep track of end devices (including the printer 304) in the tenant network 102. When a client device attempts to discover the printer 304 via a multicast protocol, an access point 302 may respond directly to the client device based on its tracked end device information, instead of propagating multicast requests from the client device throughout the tenant network 102. Thus, a client device may still discovery the printer 304 even when multicast requests are filtered by the access points 302.

After it has discovered the printer 304, the target access point 302A obtains one or more printer attributes 314 from the printer 304. The printer attributes 314 may include supply levels of the printer 304. The supply levels of the printer 304 may include a marker level (e.g., ink level or toner level) for the printer 304, a paper level of the printer 304, and the like. The printer attributes 314 may also include an upper bound and a lower bound for a supply level. The printer attributes 314 may include other objects, such the capabilities and defaults of the printer 304 (e.g., input/output tray parameters, supported media sizes, two-sided printing, etc.); the status of the printer 304 (e.g., paper out, paper jam, low markers, etc.); information about print jobs of the printer 304 and their associated documents (e.g., RFC 3805 information); information about the historical usage of the printer 304; and the like.

In some implementations, the printer attributes 314 for the printer 304 include the marker level of each color of marker (e.g., magenta, cyan, yellow, and black). The printer attributes 314 may also include an upper bound and a lower bound for a marker level. A marker level being near its upper bound indicates the cartridge for the corresponding marker is near-full, while a marker level being near its lower bound indicates the cartridge for the corresponding marker is near-empty. The printer attributes 314 may also include a name describing the meaning for a marker level. The printer attributes 314 may also include a color for a marker level. The printer attributes 314 may also include a message for a marker level, providing a human-readable status message for the marker level.

The target access point 302A may obtain the printer attributes 314 from the printer 304 by sending an attribute request to the IP address from the discovery request 312. The attribute request may be sent via a network printing protocol. Examples of network printing protocols include the Internet Printing Protocol, the Line Printer Daemon protocol/Line Printer Remote protocol, and the like. In an implementation, the Internet Printing Protocol is used, as it is a secure application-level protocol for network printing. The attribute request may specify the attributes that are desired from the printer 304. The printer 304 may send the printer attributes 314 to the target access point 302A, responsive to the attribute request.

After it has obtained the printer attributes 314 from the printer 304, the target access point 302A sends the printer attributes 314 to the network management service 104. The target access point 302A also sends network details about its discovered end devices (e.g., the printer 304) to the network management service 104. A management message may be created by combining the printer attributes 314 and the network details about the printer 304, and that management message may be sent to the network management service 104. In some implementations, the access points 302 cache data (e.g., printer attributes) over time and periodically push their cached data to the network management service 104. In some implementations, the printer attributes 314 are stored in a database of the target access point 302A, and the printer attributes 314 are sent to the network management service 104 by synchronizing the database to the network management service 104 (e.g., to the device data store 210, see FIG. 2). Thus, the network management service 104 may receive a database including the printer attributes 314. The data may be serialized to a suitable data format, such as Protocol Buffers. The network management service 104 then generates a wireless configuration based at least in part on the printer attributes 314. The wireless configuration includes access policies for one or more printers (including an access policy for the printer 304) and ranks of the printers (including a rank of the printer 304).

The access policy for the printer 304 is generated based on a management configuration of the tenant network 102. The management configuration of the tenant network 102 includes information regarding the deployment and state of the tenant network 102, as defined by a network administrator of the tenant network 102 via the network management service 104. The management configuration may be stored in a database (e.g., the device data store 210, see FIG. 2) of the network management service 104. The management configuration may include role configurations for users of the tenant network 102. The access policies may be generated based on the role configurations. For example, the access policy for the printer 304 may indicate that users in certain roles are authorized to discover the printer 304.

The rank of the printer 304 is generated based on the printer attributes 314. As previously noted, the printer attributes 314 may include supply levels of the printer 304. For example, the printer attributes 314 may indicate the level of each marker cartridge of the printer 304, the paper level of the printer 304, etc. The rank of the printer 304 may be dynamically generated by calculating a weighted sum of its supply levels and comparing that weighted sum against the weighted sums of other printers in the tenant network 102. The weights used to calculate the weighted sums may be selected to prefer printers with higher supply levels being ranked higher. The printers in the tenant network 102 may be ranked in descending order of their weighted sums.

After it has generated the access policy for the printer 304 and the rank of the printer 304, the network management service 104 sends a wireless configuration 316 to the access points 302. The wireless configuration 316 may be sent to multiple access points 302, including those other than the target access point 302A, such as the access points 302 to which the printer 304 shall be available. In some implementations, the wireless configuration 316 is sent via control messages to the access points 302. In some implementations, the wireless configuration 316 is stored in a database (e.g., the device data store 210, see FIG. 2) of the network management service 104, and the wireless configuration 316 is sent to the access points 302 by synchronizing the database to the access points 302. Thus, the access points 302 may each receive a database including the wireless configuration 316. The data may be serialized to a suitable data format, such as Protocol Buffers.

In some implementations, database synchronization may be used for communication between the access points 302 and the network management service 104. For example, the same database may include both the printer attributes 314 (stored by the access points 302) and the wireless configuration 316 (stored by the network management service 104). The database may be periodically synchronized between the access points 302 and the network management service 104.

The wireless configuration 316 may be periodically regenerated by the network management service 104, such as in response to the network management service 104 receiving new printer attributes or a new management configuration. A new wireless configuration 316 may then be sent to the access points 302. When the wireless configuration 316 is stored in a database of the network management service 104, the new wireless configuration 316 may be sent to the access points 302 by resynchronizing the database to the access points 302.

The access points 302 may be programmed with the wireless configuration 316, such as by storing the wireless configuration 316 at the access points 302 and applying the wireless configuration 316 to the operation of the access points 302. The wireless configuration 316 specifies how the access points 302 should operate within the tenant network 102. Additionally, the wireless configuration 316 includes the access policy for the printer 304 and the rank of the printer 304.

A user device 306 may discover the available printers (e.g., the printer 304) by sending a discovery request 318 to a target access point 302B. In this example, the discovery request 318 is sent to a different target access point 302B than the target access point 302A which collected the printer attributes 314, although the discovery request 318 may be sent to the same target access point 302A which collected the printer attributes 314. Similar to the discovery request 312 sent by the printer 304, the discovery request 318 may be a multicast request that is sent via a multicast protocol. The target access point 302B may filter the multicast request so that it is not propagating throughout the tenant network 102.

Instead, the target access point 302B responds to the discovery request 318 using its wireless configuration 316. The printers available to the user device 306 (as specified by the access policies of the wireless configuration 316) are determined. The ranks for those printers are also included in the wireless configuration 316. A list of available printers along with the ranks of the available printers is provided in a response to the user device 306. The previously-collected attributes of the available printers may also be provided in the response to the user device 306. For example, when the printer attributes are stored in a database synchronized to the access points 302, those attributes may be included in the response to the user device 306. A printer list message 320 may be created by combining the list of available printers and their ranks, and that printer list message 320 may be sent to the user device 306. When printing, the user device 306 may collate the list of available printers with their ranks, and may display the list of available printers to the user ordered (in descending order) by their ranks. Thus, the printer most likely to offer a successful printing experience is located at the top of the list of available printers, and is more likely to be selected by the user for printing. When the attributes of the available printers are provided to the user device 306, the supply levels and/or statuses of the printers may also be included in the printer list message 320 and shown in the list of available printers.

In some implementations, the user device 306 prints to the printer 304 via an application for the printer 304. For example, the application of the user device 306 may send the discovery request 318 to the target access point 302B, receive the list of available printers from the target access point 302B, submit a print job to the printer 304, and cancel a print job at the printer 304. The application may submit and cancel print jobs via the same network printing protocol used by the target access point 302B to acquire attributes from the printer 304.

Optionally, the network management service 104 may generate a maintenance record 322 for the printers based on the printer attributes. The maintenance record 322 may be displayed to an administrator of the tenant network 102, such as via the management interface 208. The maintenance record 322 may include a list of the printers in the tenant network 102, as well as ranks of the printers. The printers in the maintenance record 322 are ranked in reverse order. For example, printers may be ranked in ascending order of weighted sums of their supply levels. The printers and their ranks from the maintenance record 322 may be displayed to a network administrator via the management interface 208. Thus, the network administrator may view of list of available printers in the tenant network 102, and the printers least likely to offer a successful printing experience are located at the top of the list of printers. Accordingly, the administrator may quickly assess which printers need to have their supplies replenished.

The maintenance record 322 may also include time series data for the attributes of the printers. For example, the printer attributes 314 may be stored in a database (e.g., the device data store 210, see FIG. 2) of the network management service 104 each time the printer attributes 314 are received by the network management service 104. The time series data from the maintenance record 322 may be displayed to a network administrator via the management interface 208. Thus, maintenance schedules of the printers may be predicted by the network administrator based on the time series data for the printer attributes 314.

Some variations are contemplated. In some implementations, the access policies for the printers 304 are also be based on the attributes of the printers 304. For example, a printer 304 may be made unavailable for printing if its supply levels are below a threshold value.

Figure 4:
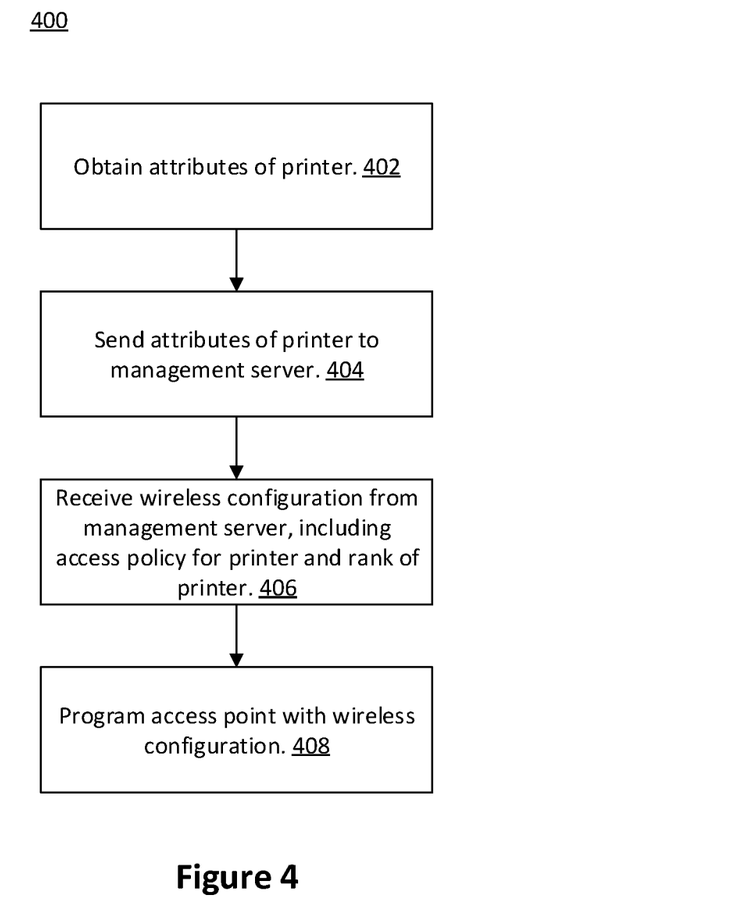
FIG. 4 is a flow diagram of an access point configuration method, according to some implementations.

FIG. 4 is a flow diagram of an access point configuration method 400, according to some implementations. The access point configuration method 400 will be described in conjunction with FIGS. 2-3. The access point configuration method 400 may be performed by an access point 302 during programming with a wireless configuration.

The access point 302 may perform a step 402 of obtaining attributes of a printer 304, the access point 302 and the printer 304 being in a first network. For example, the first network may be a tenant network 102. The attributes of the printer 304 may include a supply level of the printer 304. The supply level of the printer 304 may include a marker level of the printer 304 or a paper level of the printer 304. The attributes may further include an upper bound for the supply level and a lower bound for the supply level. Obtaining the attributes of the printer 304 may include: receiving a discovery request from the printer 304 including an IP address; and sending an attribute request to the IP address via a network printing protocol.

The access point 302 may perform a step 404 of sending the attributes of the printer 304 to a network management server 202, the network management server 202 being in a second network, the second network being different than the first network. The network management server 202 may be part of the network management service 104. The second network may be a cloud network. Sending the attributes of the printer 304 to the network management server 202 may include sending a database including the attributes of the printer 304 to the network management server 202.

The access point 302 may perform a step 406 of receiving a wireless configuration from the network management server 202, the wireless configuration including an access policy for the printer 304 and a rank of the printer 304. The access policy for the printer 304 is generated based on a management configuration of the first network, while the rank of the printer 304 is generated based on the attributes of the printer 304. The access policy may have been generated, by the network management server 202, based on the attributes of the printer 304 that were previously sent to the network management server 202.

The access point 302 may perform a step 408 of programming the access point 302 with the wireless configuration. Thus, the operation of the access point 302 in the tenant network 102 may be specified. Additionally, the access point 302 may be configured to filter multicast requests, such as those from client devices attempting to discover the printer 304 via a zero-configuration networking technology.

The access point configuration method 400 may optionally include additional steps. For example, the access point 302 may perform a step of receiving a discovery request from a client device. The access point 302 may also perform a step of providing the rank of the printer 304 to the client device in response to the access policy indicating the printer 304 is available to the client device. The access point 302 may also perform a step of providing the attributes of the printer 304 with the rank of the printer 304 to the client device.

Figure 5:
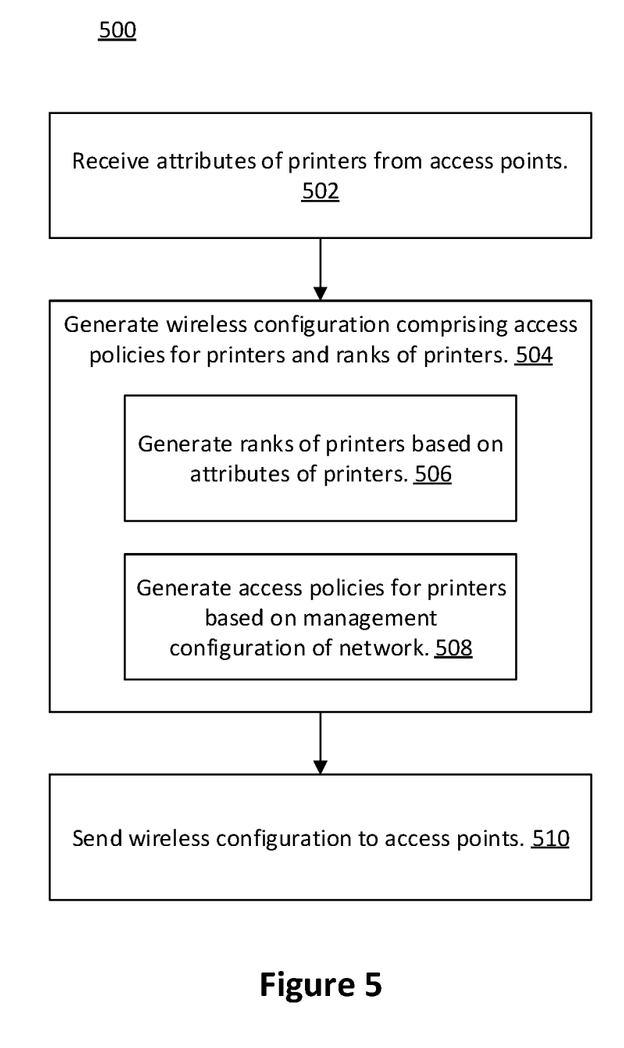
FIG. 5 is a flow diagram of a management server configuration method, according to some implementations.

FIG. 5 is a flow diagram of a network management method 500, according to some implementations. The network management method 500 will be described in conjunction with FIGS. 2-3. The network management method 500 may be performed by a network management server 202 of the network management service 104 during programming of an access point 302 with a wireless configuration.

The network management server 202 may perform a step 502 of receiving attributes of printers 304 from access points 302, the access points 302 and the printers 304 being in a first network, the network management server 202 being in a second network, the second network being different than the first network. The attributes of the printers 304 may include supply levels of the printers 304. Receiving the attributes of the printers 304 from the access points 302 may include receiving a database including the attributes of the printers 304 from the access points 302.

The network management server 202 may perform a step 504 of generating a wireless configuration including access policies for the printers 304 and ranks of the printers 304.

The network management server 202 may perform a step 506 of generating the ranks of the printers 304 based on the attributes of the printers 304. When the attributes of the printers 304 include supply levels of the printers 304, generating the ranks of the printers 304 may include ranking the printers 304 in descending order of weighted sums of the supply levels.

The network management server 202 may perform a step 508 of generating the access policies for the printers 304 based on a management configuration of the first network. The management configuration of the first network may include role configurations for users. Generating the access policies for the printers 304 may include generating the access policies for the printers 304 based on the role configurations.

The network management server 202 may perform a step 510 of sending the wireless configuration to the access points 302. Sending the wireless configuration to the access points 302 may include sending a database including the wireless configuration to the access points 302.

The network management method 500 may optionally include additional steps. For example, the network management server 202 may perform a step of generating a maintenance record for the printers 304 based on the attributes of the printers 304. The network management server 202 may perform a step of displaying the maintenance record via a management interface 208 for the network management server 202. When the attributes of the printers 304 include supply levels of the printers 304, generating the maintenance record for the printers 304 may include ranking the printers 304 in ascending order of weighted sums of the supply levels. Generating the maintenance record for the printers 304 may include: generating time series data for the attributes of the printers 304; and predicting maintenance schedules of the printers 304 based on the time series data for the attributes. The network management server 202 may perform a step of periodically synchronizing the database (containing the attributes of the printers 304 and/or the wireless configuration) between the access points 302 to which the printers 304 shall be available.

The foregoing outlines features of several examples so that those skilled in the art may better understand the aspects of the present disclosure. Various modifications and combinations of the illustrative examples, as well as other examples, will be apparent to persons skilled in the art upon reference to the description. It is therefore intended that the appended claims encompass any such modifications.

What is claimed is:

1. A method, implemented by an access point, the method comprising:
   obtaining attributes of a printer, the access point and the printer being in a first network, wherein the attributes of the printer comprise a supply level of the printer;
   sending the attributes of the printer to a network management server, the network management server being in a second network, the second network being different than the first network;
   receiving a wireless configuration from the network management server, the wireless configuration comprising an access policy for the printer and a rank of the printer, the access policy for the printer generated based on a management configuration of the first network, the rank of the printer generated based on the attributes of the printer; and
   programming the access point with the wireless configuration.

2. The method of claim 1, further comprising:
   receiving a discovery request from a client device; and
   providing the rank of the printer to the client device in response to the access policy indicating the printer is available to the client device.

3. The method of claim 2, further comprising:
   providing the attributes of the printer with the rank of the printer to the client device.

4. The method of claim 1, wherein sending the attributes of the printer to the network management server comprises sending a database comprising the attributes of the printer to the network management server.

5. The method of claim 1, wherein obtaining the attributes of the printer comprises:
   receiving a discovery request from the printer comprising an IP address; and
   sending an attribute request to the IP address via a network printing protocol.

6. The method of claim 1, wherein the supply level of the printer comprises a marker level of the printer.

7. The method of claim 1, wherein the supply level of the printer comprises a paper level of the printer.

8. The method of claim 1, wherein the attributes further comprise an upper bound for the supply level and a lower bound for the supply level.

9. A method, implemented by a network management server, the method comprising:
   receiving attributes of printers from access points, the access points and the printers being in a first network, the network management server being in a second network, the second network being different than the first network, wherein the attributes of the printers comprise supply levels of the printers;
   generating a wireless configuration comprising access policies for the printers and ranks of the printers by:
      generating the ranks of the printers based on the attributes of the printers, wherein generating the ranks of the printers comprises: ranking the printers in descending order of weighted sums of the supply levels; and
      generating the access policies for the printers based on a management configuration of the first network; and
   sending the wireless configuration to the access points.

10. The method of claim 9, further comprising:
    generating a maintenance record for the printers based on the attributes of the printers; and
    displaying the maintenance record via a management interface for the network management server.

11. The method of claim 10, wherein the attributes of the printers comprise supply levels of the printers, and generating the maintenance record for the printers comprises:
    ranking the printers in ascending order of weighted sums of the supply levels.

12. The method of claim 10, wherein generating the maintenance record for the printers comprises:
    generating time series data for the attributes of the printers; and
    predicting maintenance schedules of the printers based on the time series data for the attributes.

13. The method of claim 9, wherein the management configuration of the first network comprises role configurations for users, and generating the access policies for the printers comprises:
    generating the access policies for the printers based on the role configurations.

14. The method of claim 9, wherein receiving the attributes of the printers from the access points comprises receiving a database comprising the attributes of the printers from the access points.

15. The method of claim 14, further comprising:
    periodically synchronizing the database between the access points to which the printers shall be available.

16. The method of claim 9, wherein sending the wireless configuration to the access points comprises sending a database comprising the wireless configuration to the access points.

17. A system comprising:
    a printer in a first network;
    an access point in the first network, the access point configured to obtain attributes of the printer via a network printing protocol; and
    a network management server in a second network, the second network being different than the first network, the network management server configured to:
       receive the attributes of the printer from the access point, wherein the attributes of the printer comprise a supply level of the printer;
       generate a rank of the printer by calculating a weighted sum of the attributes of the printer;
       generate an access policy for the printer based on a management configuration of the first network; and
       send a wireless configuration to the access point, the wireless configuration comprising the access policy for the printer and the rank of the printer,
    wherein the access point is further configured to filter multicast requests from the printer.

* * * * *